(12) United States Patent
Delight, IV et al.

(10) Patent No.: US 11,551,113 B2
(45) Date of Patent: Jan. 10, 2023

(54) INTELLIGENT MACHINE PROCESSING OF QUERIES FOR CLOUD-BASED NETWORK FILE STORE

(71) Applicant: JetClosing Inc., Seattle, WA (US)

(72) Inventors: Arthur C. Delight, IV, Seattle, WA (US); David Wolf, Redwood, WA (US)

(73) Assignee: JETCLOSING INC., Seattle, WA (US)

( * ) Notice: Subject to any disclaimer, the term of this patent is extended or adjusted under 35 U.S.C. 154(b) by 556 days.

(21) Appl. No.: 16/680,743

(22) Filed: Nov. 12, 2019

(65) Prior Publication Data
US 2020/0175399 A1  Jun. 4, 2020

Related U.S. Application Data

(60) Provisional application No. 62/773,734, filed on Nov. 30, 2018.

(51) Int. Cl.
*G06F 7/00* (2006.01)
*G06N 5/04* (2006.01)
(Continued)

(52) U.S. Cl.
CPC ............ *G06N 5/04* (2013.01); *G06F 16/148* (2019.01); *G06F 16/9535* (2019.01); *G06N 20/00* (2019.01); *G06Q 20/29* (2013.01)

(58) Field of Classification Search
CPC .. G06F 16/148; G06F 16/9535; G06F 3/1212; G06F 3/1288; G06F 3/1261; G06F 3/1238; G06F 3/1222; G06N 5/04; G06N 20/00; G06Q 20/29; G06Q 30/06; G06Q 20/38215; G06Q 20/3827; G06Q 20/409; G06Q 20/065
See application file for complete search history.

(56) References Cited

U.S. PATENT DOCUMENTS 6,023,714 A   2/2000 Hill
7,076,452 B2  7/2006 Florance et al.
(Continued)

OTHER PUBLICATIONS

Treebold, "How to Find a Property Parcel Number," Encyclopedia. com, Feb. 13, 2018, available at https://www.encyclopedia.com/articles/how-to-find-a-property-parcel-number; 3 pages.
(Continued)

*Primary Examiner* — Mohammad A Sana
(74) *Attorney, Agent, or Firm* — Brownstein Hyatt Farber Schreck, LLP (57) ABSTRACT

A system for intelligently processing queries for cloud-based network file stores includes a file store that stores groups of documents that are associated with files, a non-transitory storage medium that stores instructions, and a processor. The processor may execute the instructions to receive a ticket based on a communication associated with a query to the file store, pull data for the ticket, check a sender of the communication, identify a file using the data, and/or analyze the communication using an artificial intelligence engine to generate a recommendation. The processor may monitor changes to the recommendation made before being sent in order to update the artificial intelligence engine for the changes.

20 Claims, 7 Drawing Sheets

(51) Int. Cl.
*G06F 16/14* (2019.01)
*G06N 20/00* (2019.01)
*G06Q 20/22* (2012.01)
*G06F 16/9535* (2019.01)

(56) References Cited

U.S. PATENT DOCUMENTS

| | | | |
|---|---|---|---|
| 7,373,362 | B2 | 5/2008 | Detweiler et al. |
| 7,873,524 | B2 | 1/2011 | Wenzlau et al. |
| 7,945,495 | B2 | 5/2011 | Hill |
| 8,271,431 | B1 | 9/2012 | Carrington |
| 8,355,935 | B2 | 1/2013 | Hellman et al. |
| 8,452,733 | B2 | 5/2013 | Chan et al. |
| 8,832,115 | B2 | 9/2014 | Smintina |
| 8,918,712 | B2 | 12/2014 | Nario et al. |
| 8,965,670 | B2 | 2/2015 | Peterson |
| 9,098,587 | B2 | 8/2015 | Deshmukh et al. |
| 9,720,566 | B1 | 8/2017 | Smyth |
| 10,068,104 | B2 | 9/2018 | Mullins et al. |
| 10,140,296 | B2 | 11/2018 | Kurian et al. |
| 10,191,860 | B2 | 1/2019 | Saldanha et al. |
| 10,438,301 | B2 | 10/2019 | Ruebush |
| 2003/0036922 | A1 | 2/2003 | Fries |
| 2005/0209872 | A1 | 9/2005 | Szymanski et al. |
| 2005/0273346 | A1 | 12/2005 | Frost |
| 2006/0015357 | A1 | 1/2006 | Cagan |
| 2006/0026136 | A1 | 2/2006 | Drucker et al. |
| 2007/0067180 | A1 | 3/2007 | James et al. |
| 2007/0260401 | A1 | 11/2007 | Sydor et al. |
| 2009/0119581 | A1 | 5/2009 | Velusamy |
| 2009/0125283 | A1 | 5/2009 | Conover |
| 2011/0154462 | A1* | 6/2011 | Charbonnier ........... H04L 63/08 709/219 |
| 2011/0289010 | A1 | 11/2011 | Rankin, Jr. et al. |
| 2013/0282524 | A1 | 10/2013 | Appolito et al. |
| 2013/0297378 | A1 | 11/2013 | Hong |
| 2014/0039941 | A1* | 2/2014 | Alvernaz ............... G06Q 30/06 705/5 |
| 2014/0222697 | A1 | 8/2014 | Maiani |
| 2015/0074018 | A1 | 3/2015 | Gill et al. |
| 2016/0012554 | A1 | 1/2016 | Dell Orfano |
| 2016/0314545 | A1 | 10/2016 | Jessen |
| 2016/0371801 | A1 | 12/2016 | Dawson |
| 2017/0076229 | A1* | 3/2017 | Sunshine ............... G06Q 50/00 |
| 2017/0186116 | A1 | 6/2017 | Poll |
| 2018/0144403 | A1 | 5/2018 | Heimowitz |
| 2018/0246774 | A1 | 8/2018 | Byrne |
| 2018/0253808 | A1 | 9/2018 | Bloomquist et al. |
| 2020/0134750 | A1 | 4/2020 | Wolf et al. |
| 2020/0175621 | A1 | 6/2020 | Wolf et al. |
| 2021/0034590 | A1 | 2/2021 | Delight et al. |
| 2021/0358061 | A1 | 11/2021 | Bloomquist et al. |

OTHER PUBLICATIONS

Folger, "Encumbrances and Nonpossessory Interests in Real Property," https://www.investopedia.com/articles/mortgages-real--estate/12/encumbrances-nonpossessory-interests.asp as published on the Way Back Machine Internet Archive, Jan. 10, 2012, 3 pages.

* cited by examiner

INTELLIGENT MACHINE PROCESSING OF QUERIES FOR CLOUD-BASED NETWORK FILE STORE

CROSS-REFERENCE TO RELATED APPLICATION(S)

This application is a nonprovisional patent application of and claims the benefit of U.S. Provisional Patent Application No. 62/773,734, filed Nov. 30, 2018 and titled "Intelligent Machine Processing of Queries for Cloud-Based Network File Stores," the disclosure of which is hereby incorporated herein by reference in its entirety.

FIELD

The described embodiments relate generally to intelligently determining and retrieving a document based on machine recognition of a request from a first party to a second party. More particularly, the present embodiments relate to devices that use machine intelligence to determine and retrieve a document based on machine recognition of a request from a first party to a second party.

BACKGROUND

File stores may include groups of documents associated with different files. These file stores may be available through a network. In some examples, client applications executing on client devices may communicate with one or more servers to query the file stores in various ways. For example, queries may involve requesting one or more documents associated with one or more files, creating new files, adding documents to files, and so on.

For example, a cloud-based network file store may store documents for files associated with escrow transactions, such as private real estate transactions. Parties and/or party agents (such as purchasers, sellers, escrow agents, realtors, lenders, and so on) may use client applications to communicate with one or more file store servers in order to obtain, process, update, and/or otherwise interact with documents associated with the file for an escrow transaction.

SUMMARY

The present disclosure relates to intelligent machine processing of queries for cloud-based network file stores. One or more cloud-based network file store servers may receive one or more communications (such as one or more emails, text messages, audio, and/or other communications from one or more client devices and/or client applications) associated with one or more queries for a file store that stores groups of documents that are each associated with different files. A file may be identified based on information in the one or more communications and a recommendation for responding to the query may be generated using one or more artificial intelligence engines (such as one or more rules engines, lists of regular expressions or other rules, inference engines, knowledge bases, computer models, and so on).

In this way, one or more cloud-based network file store servers may be capable of automatically and/or semi-automatically interpreting and processing queries for a file store that they would not otherwise be capable of performing. This may involve less configuration of client devices and/or client applications, less knowledge in operating client devices and/or client applications, more efficient client device operation, less network usage for communication between client devices and/or client applications and cloud-based network file stores, less personnel at the level of accessing the network file store, more efficient use of cloud-based network file store resources, and so on.

In some embodiments, personnel who access the network file store may review and/or modify the generated recommendations before query responses are sent. Generated recommendations (such as draft emails, text messages, and/or other communications responses) may include one or more documents, references to such documents, and/or information about such documents and/or the query that the personnel may select, remove, and/or otherwise modify.

In various embodiments, the recommendations may be sent automatically. In some implementations, some generated recommendations may be automatically sent while others are reviewed (such as those generated with a high confidence score of correctly responding to the query associated with the communication, those not flagged for screening by network file store level personnel to ensure automatically sent responses are correctly responding to the query associated with the communication, and so on).

In various implementations where generated recommendations are modified before sending, the system may monitor changes that are made to the recommendation before sending and the artificial intelligence engine may be updated based on those changes. In this way, the recommendations generated by the artificial intelligence engine may be made more accurate and efficient by taking into account what should have been generated in the recommendations as compared to what was actually generated, essentially "learning" over time.

In some implementations, a system for intelligent machine processing of queries for cloud-based network file stores may be a ticket-based system where a ticket is received for an initial communication associated with a query and subsequent communications associated with that query are part of a conversation corresponding to the ticket. In some examples of such implementations, separate tickets may be generated when an initial communication includes multiple queries and/or when subsequent communications in the conversation include new queries.

In various embodiments, a system for intelligently processing queries for cloud-based network file stores includes a cloud-based file store that stores groups of documents that are associated with files, a non-transitory storage medium that stores instructions, and a processor. The processor executes the instructions to receive a ticket based on a communication associated with a query to the file store, pull data for the ticket, check a sender of the communication, identify a file using the data, and analyze the communication using an artificial intelligence engine to generate a recommendation.

In some examples, the artificial intelligence engine includes at least one regular expression. In various examples, the artificial intelligence engine includes a computer model.

In various examples, the communication is an email. In various examples, the communication is a text message. In still other examples, the communication is a telephone call. In some examples, the communication is an incoming communication. In other examples, the communication is an outgoing communication.

In some examples, the query is multiple queries. In various implementations of such examples, the recommendation addresses the multiple queries. In other implementations of such examples, the processor generates multiple recommendations that each address one of the multiple queries.

In various examples, the processor receives an additional communication that is part of a conversation regarding the ticket. In some implementations of such examples, the processor generates an additional ticket if the additional communication includes an additional query.

In some examples, the processor modifies the artificial intelligence engine based on changes personnel make to the recommendation before sending a query response.

In some embodiments, a system for intelligently processing queries for cloud-based network file stores includes a non-transitory storage medium that stores instructions and a processor. The processor executes the instructions to receive a communication associated with a query to a file store that stores groups of documents that are associated with files, check a sender of the communication, and analyze the communication using a computer model generated based on monitored changes to previous recommendations to identify a file and generate a recommendation.

In various examples, the communication is received from a client application executing on a client device. In some examples, the files are associated with escrow transactions.

In various embodiments, a system for intelligently processing queries for cloud-based network file stores includes a non-transitory storage medium that stores instructions and a processor. The processor executes the instructions to receive a communication associated with a query to a file store that stores groups of documents that are associated with files, check a sender of the communication, identify a file based on the communication, and analyze the communication using an artificial intelligence engine to generate a recommendation.

In some examples, the processor determines additional data is needed to identify the file and transmits a request for the additional data. In various examples, the recommendation includes at least one document obtained from the file store.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, apparatuses, methods, and computer program products that embody various elements of the present disclosure. However, it should be understood that the described disclosure may be practiced in a variety of forms in addition to those described herein.

One approach to a system for machine processing of queries for cloud-based (cloud-based is a term that refers to applications, services, or resources made available to users on demand via a network, such as the Internet, from a cloud computing provider's servers) network file stores may be to configure each client device and client application to directly interface with the cloud-based network file store. This may not require personnel at the level of accessing the network file store to evaluate and respond to queries submitted via the client devices and/or client applications. However, this may involve a great deal of configuration to be done to client devices and/or client applications, and may involve a great deal of knowledge for how queries are to be formatted and submitted in order to use client devices and/or client applications. This may also result in high network utilization in transmitting a large number of queries back and forth between various client devices and/or client applications and cloud-based network file stores. As a result, such a system may not be particularly efficient in the use of hardware, network, personnel, and/or other processing resources.

Another approach may be to submit communications (such as emails, text messages, text documents, audio, and so on) to the cloud-based network file store via client devices and/or client applications. Personnel at the level of accessing the network file store may review such communications and interact with the file store for queries associated with the communications (such as creation of a new file, retrieving and/or updating one or more documents associated with a file, and so on). This approach may involve less configuration and resources on the part of client devices and/or client applications, as well as knowledge for use of such. In some implementations, communications submitted via client devices and/or client applications may even be in natural language that is interpreted by personnel at the level of accessing the network file store. However, this approach may require personnel to review and process such communications. Such a personnel-accessed file store may not process such communications automatically and/or semi-automatically. This may also require use of hardware and/or other processing resources to track whether such communications have been reviewed and processed and/or may be vulnerable to human error regarding whether or not such communications have been reviewed and processed. As a result, such a system may not be any more efficient in the use of hardware, network, personnel, and/or other processing resources than the one discussed above.

The following disclosure relates to intelligent machine processing of queries for cloud-based network file stores. One or more cloud-based network file store servers may receive one or more communications (such as one or more emails, text messages, audio, and/or other communications from one or more client devices and/or client applications) associated with one or more queries related to escrow transactions, such as private real estate transactions, for a file store that stores groups of escrow transaction documents that are each associated with different escrow transaction files. A file may be identified based on information in the one or more communications and a recommendation for responding to the query may be generated using one or more artificial intelligence engines (such as one or more rules engines, lists of regular expressions or other rules, inference engines, knowledge bases, computer models, and so on). One or more escrow transaction documents may be retrieved and attached to a draft reply communication as part of generating the recommendation.

In this way, one or more cloud-based network file store servers may be capable of automatically and/or semi-automatically interpreting and processing queries related to escrow transactions, such as private real estate transactions, for a file store that they would not otherwise be capable of performing. This may involve less configuration of client devices and/or client applications, less knowledge in operating client devices and/or client applications, more efficient client device operation, less network usage for communication between client devices and/or client applications and cloud-based network file stores, less personnel at the level of accessing the network file store, more efficient use of cloud-based network file store resources, and so on.

In some embodiments, personnel who access the network file store may review and/or modify the generated recommendations before query responses are sent. Generated recommendations (such as draft emails, text messages, and/or other communications responses) may include one or more documents, references to such documents, and/or information about such documents and/or the query that the personnel may select, remove, and/or otherwise modify.

In various embodiments, the recommendations may be sent automatically. In some implementations, some generated recommendations may be automatically sent while others are reviewed (such as those generated with a high confidence score of correctly responding to the query associated with the communication, those not flagged for screening by network file store level personnel to ensure automatically sent responses are correctly responding to the query associated with the communication, and so on).

In various implementations where generated recommendations are modified before sending, the system may monitor changes that are made to the recommendation before sending and the artificial intelligence engine may be updated based on those changes. In this way, the recommendations generated by the artificial intelligence engine may be made more accurate and efficient by taking into account what should have been generated in the recommendations as compared to what was actually generated, essentially "learning" over time.

In some implementations, a system for intelligent machine processing of queries for cloud-based network file stores may be a ticket-based system where a ticket is received for an initial communication associated with a query related to an escrow transaction, such as a private real estate transaction, and subsequent communications associated with that query are part of a conversation corresponding to the ticket. In some examples of such implementations, separate tickets may be generated when an initial communication includes multiple queries and/or when subsequent communications in the conversation include new queries.

These and other embodiments are discussed below with reference to FIGS. 1-6. However, those skilled in the art will readily appreciate that the detailed description given herein with respect to these figures is for explanatory purposes only and should not be construed as limiting.

Figure 1:
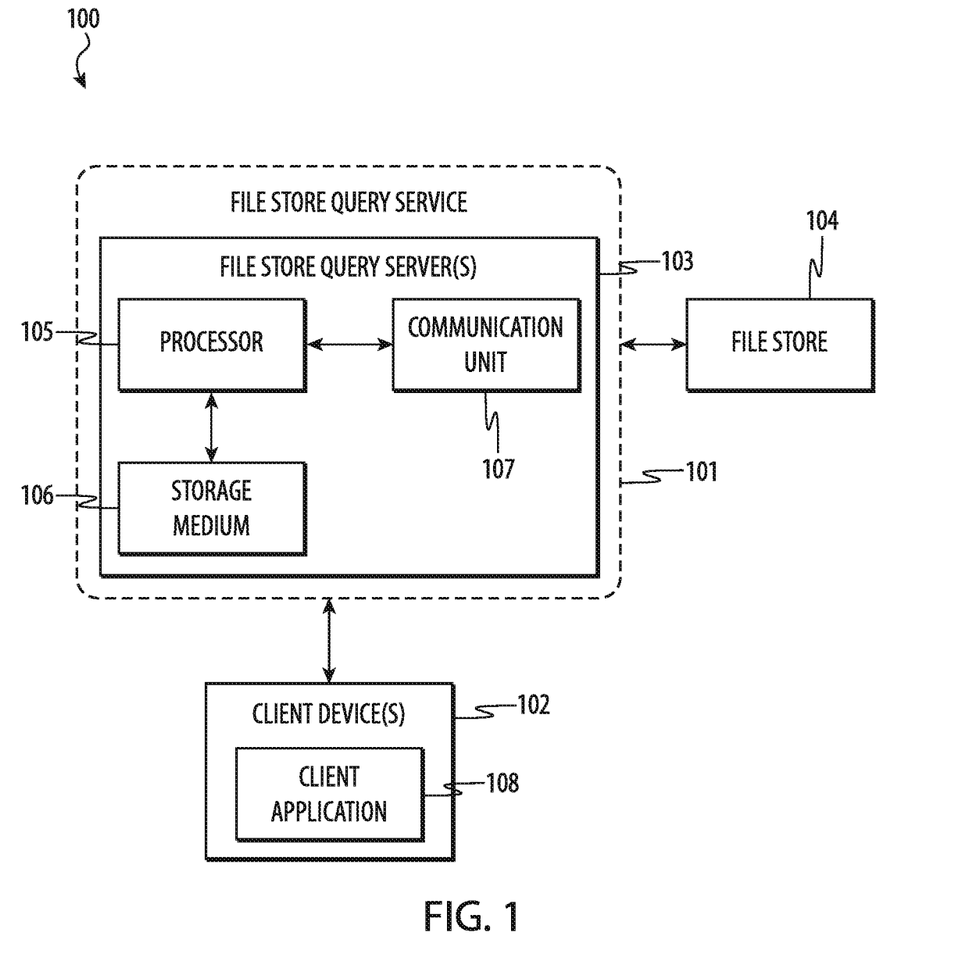
FIG. 1 depicts an example system for intelligent machine processing of queries related to escrow transactions, such as private real estate transactions, for cloud-based network file stores.

FIG. 1 depicts an example system 100 for intelligent machine processing of queries related to escrow transactions, such as private real estate transactions, for cloud-based network file stores. The system 100 may include a file store query service 101 that is implemented by one or more file store query servers 103. The file store query service 101 may be operable to communicate with one or more client applications 108 executing on one or more client devices 102. The file store query service 101 may also be operable to communicate with one or more file stores 104. The file store 104 may store groups of one or more documents where each group is associated with one or more files.

The file store query server 103 may include one or more processors 105, one or more non-transitory storage media 106 (which may take the form of, but is not limited to, a magnetic storage medium; optical storage medium; magneto-optical storage medium; read only memory; random access memory; erasable programmable memory; flash memory; and so on), one or more communication units 107, and/or one or more other components. The client device 102 and/or the file store 104 may also include one or more processors, non-transitory storage media, communication units, and/or other components. The processor 105 may execute instructions stored in the non-transitory storage media 106 to perform various file store query server functions. Examples of such functions include communicating with the client device 102 and/or the file store 104, processing queries related to escrow transactions (such as private real estate transactions) associated with such communications, using and/or updating one or more artificial intelligence engines (such as one or more rules engines, lists of regular expressions or other rules, inference engines, knowledge bases, computer models, and so on) associated with processing such queries, and so on.

The file store query server 103 may receive one or more communications (such as one or more emails, text messages, audio, and/or other communications from one or more client devices and/or client applications) associated with one or more queries related to escrow transactions, such as private real estate transactions, for the file store 104. For example, the file store query server 103 may receive such communications from the client application 108 executing on the client device 102 via the communication unit 107. The file store query server 103 may then launch one or more processes, such as one or more asynchronous processes, to process the query/queries. As part of such processing, a file may be identified based on information in the one or more communications and a recommendation for responding to the query may be generated using one or more artificial intelligence engines (such as one or more rules engines, lists of regular expressions or other rules, inference engines, knowledge bases, computer models, and so on). Generating the recommendation may involve retrieving one or more escrow transaction documents and attaching the escrow transaction documents to a draft communication.

In this way, the file store query server 103 may be capable of automatically and/or semi-automatically interpreting and processing queries related to escrow transactions, such as private real estate transactions, for the file store 104 that the file store query server 103 would not otherwise be capable of performing. This may involve less configuration of the client device 102 and/or the client application 108, less knowledge in operating the client device 102 and/or the client application 108, more efficient client device 102 operation, less communication network usage for communication between the client device 102 and/or the client application 108 and the file store query server 103, less personnel at the file store query server 103 level, more efficient use of file store query server 103 resources, and so on.

In some embodiments, personnel at the file store query server 103 level may review and/or modify the generated recommendations before query responses are sent. Generated recommendations (such as draft emails, text messages, and/or other communications responses) may include one or more documents, references to such documents, and/or information about such documents and/or the query that the personnel may select, remove, and/or otherwise modify.

In various embodiments, the file store query server 103 may send the recommendations automatically. In some implementations, the file store query server 103 may send some generated recommendations automatically while others are reviewed (such as those generated with a high confidence score of correctly responding to the query associated with the communication, those not flagged for screening by the file store query server 103 level personnel to ensure automatically sent responses are correctly responding to the query associated with the communication, and so on).

Although FIG. 1 illustrates a file store query server 103 operating independently, it is understood that this is an example. In some implementations, the file store query service 101 may be implemented by a number of file store query servers 103 configured in a cloud computing and/or other cooperative computing arrangement. Various arrangements are possible and contemplated without departing from the scope of the present disclosure.

Further, although FIG. 1 is discussed in the context of queries related to escrow transactions, such as private real estate transactions, and escrow transaction documents, it is understood that this is an example. In other implementations, the technologies discussed herein may be used in other contexts without departing from the scope of the present disclosure.

Additionally, although the above is illustrated and described in the context of analyzing the communication for identifying or checking the file and/or generating the recommendation, it is understood that this is an example and that other information may be additionally and/or alternatively analyzed to identify or check the file and/or generate the recommendation without departing from the scope of the present disclosure. In some implementations, various properties of the file, the sender, and so on may be additionally and/or alternatively used. For example, a sender may be identified as a loan officer associated with a file and recommendations appropriate for loan officers may be generated as opposed to recommendations appropriate for senders performing other roles, such as realtors. Various arrangements are possible and contemplated without departing from the scope of the present disclosure.

Although cloud-based network file stores are discussed herein, it is understood that the technologies discussed herein may be used outside of cloud-based context without departing from the scope of the present disclosure. In some implementations, cloud-based systems may be used where file stores may be either inside or outside the cloud. Various configurations are possible and contemplated.

Figure 2:
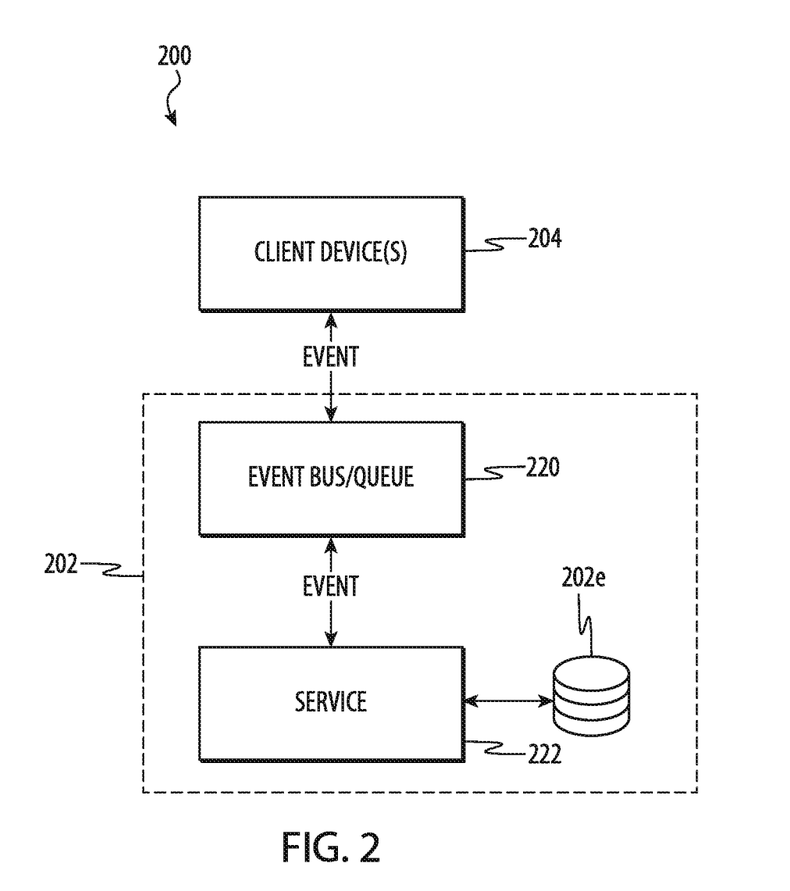
FIG. 2 depicts an example of an event-driven architecture.

Similarly, it may be appreciated that a system, such as described herein, can be implemented with any number of suitable communications architectures. For example, although many embodiments described herein reference a request-response architecture, it may be appreciated that this is merely one example. More specifically, in other embodiments, such as shown in FIG. 2, an event-driven architecture can be used. In particular the system 200 depicted in FIG. 2 shows a host service 202 communicably coupled to a client device 204. The host service 202 includes an event bus 220 (also referred to as an event dispatch, an event queue, a message queue, or any other suitable similar phrase). The event bus 220 is configured to asynchronously receive and store discrete data items referred to as "events" formatted according to a specification or protocol unique to the system 200 and/or conforming with a specified messaging protocol. In this example, the event bus 220 can receive events from the client device 204 and store those events in a queue based on a time stamp or indexed order in which each event was received and/or added to the event bus 220. Thereafter, events stored by the event bus 220 can be consumed by one or more services, servers, microservices, functions, lambda functions, and so on associated with an operation or task of the host service 202. Collectively, these example event-consuming elements are depicted in FIG. 2 as the service 222. The service 222 can receive and/or consume events and/or be notified of new events from the event bus 220 in any suitable manner. Examples include, but are not limited to: registering the service 222 as a callback executed by the event bus 220 once an event of a given type is received; registering the service 222 as a subscriber of a particular message type generated by the event bus 220 in response to the event bus 220 receiving an event of a particular type or an event that changes a particular state; registering the event bus 220 as a subscriber of one or more announcements of state changes or events periodically generated or broadcast by the event bus 220; and so on. In some embodiments, the service 222 can include or can be coupled to a state database 202e that locally stores partial or complete state information or event information, at least partially mirroring information contained/stored by the event bus 220.

The foregoing example communication architecture is not exhaustive of the various types of communication(s) that can be implemented to exchange and/or process information through a system, such as described herein. As such, it may be appreciated that, generally and broadly and regardless of architecture or implementation, a system such as described herein is configured to cause one or more client devices executing the same client application to self-configure and display different information based on a configuration file, schema, or other instruction.

Figure 3:
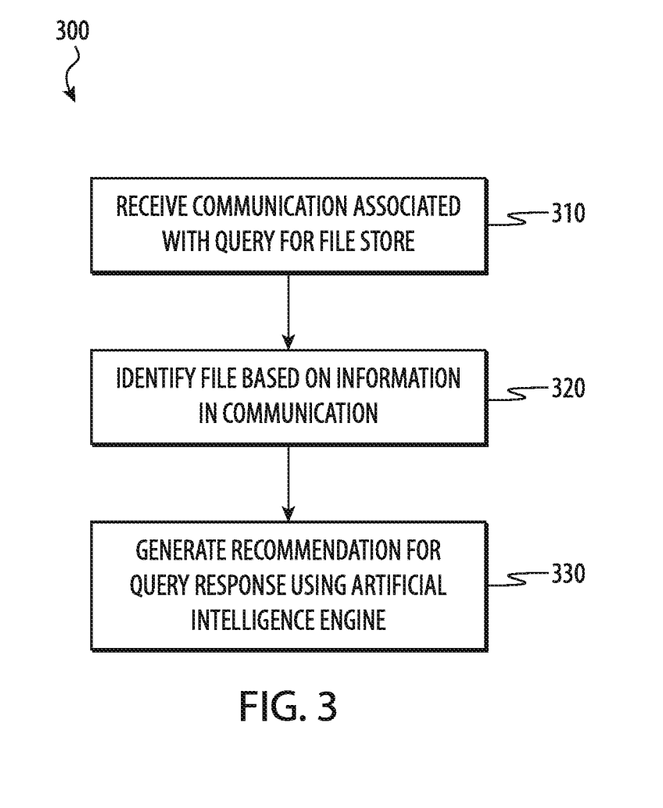
FIG. 3 depicts a flow chart illustrating a first example method for intelligent machine processing of queries related to escrow transactions, such as private real estate transactions, for cloud-based network file stores. This method may be performed by the file store query server of FIG. 1.

FIG. 3 depicts a flow chart illustrating a first example method 300 for intelligent machine processing of queries related to escrow transactions, such as private real estate transactions, for cloud-based network file stores. This method 300 may be performed by the file store query server 103 of FIG. 1.

At operation 310, an electronic device may receive one or more communications associated with a query related to escrow transactions, such as private real estate transactions, for a file store. For example, the communication may be an email or other communication requesting one or more escrow transaction documents associated with a file.

At operation 320, the electronic device may identify a file based on information in the communication. For example, the electronic device may analyze the communication to determine a sender of the communication, an order number or other identifier (such as a property address for files associated with a private property transaction or other escrow transaction related to the property) specified in the communication, the names of one or more documents specified in the communication, and so on. The electronic device may use data from such analysis to identify a file, filter among multiple possible files, and so on.

At operation 330, the electronic device may generate a recommendation for a query response using an artificial intelligence engine (such as one or more rules engines, lists of regular expressions or other rules, inference engines, knowledge bases, computer models, and so on). In some examples, the artificial intelligence engine may include one or more rules. Such rules may include one or more regular expressions that may be used to parse text or other information included in the communication to obtain data that may be used to identify one or more documents in the identified file, filter among multiple possible documents in the identified file, select various documents that may be responsive to the query, and so on. In other examples, the artificial intelligence engine may include a computer model generated based on previous data gathered by providing generated recommendations and monitoring how the recommendations are changed by personnel before sending the associated response. One or more escrow transaction documents may be retrieved and attached to a draft communication as part of generating the recommendation.

Although the example method 300 is illustrated and described as including particular operations performed in a particular order, it is understood that this is an example. In various implementations, various orders of the same, similar, and/or different operations may be performed without departing from the scope of the present disclosure.

For example, in some examples, the method 300 may additionally include sending the recommendation as a response to the communication, determining whether or not to send the recommendation as a response to the communication, presenting the recommendation to personnel to send or modify prior to sending as a response to the communication, and so on. Various configurations are possible and contemplated without departing from the scope of the present disclosure.

By way of illustration, in some examples, the file may be associated with an escrow transaction, such as a private property transaction. In such examples, the file may include one or more documents related to the escrow transaction. Examples of such documents may include, but are not limited to, pre-approval letters, identity documents, proof of insurance and/or insurability, property description documents, property tax documents, earnest money deposit documents, appraisal documents, inspection documents, commitment letters, common interest community documents, homeowners association documents, party wall agreements, easement documents, loan and/or financing documents, seller disclosure documents, executed approvals or disclosures, title insurance documents, title commitment documents, and so on. In such an example, a communication associated with a query may include an escrow transaction order number, property address, or other information that may be used to identify the escrow transaction file and an artificial intelligence engine (such as one or more rules engines, lists of regular expressions or other rules, inference engines, knowledge bases, computer models, and so on) may then be used to generate a recommendation email with one or more documents attached from the file that may be responsive to the query.

For example, the communication may request "the approval", as discussed herein. The artificial intelligence engine may evaluate a status of the file to determine what items have been completed in the escrow transaction process and what items need to be completed. It may determine that an inspection report has been approved by a buyer but not yet provided to the seller. It may also determine that the sender of the communication is the seller's agent. As such, the recommendation may include the document from the file store associated with the file evidencing the buyer's approval of the inspection report.

However, in other examples, the files may be associated with processes other than escrow transactions. For example, files may be associated with insurance purchase transactions, personal property transactions, health and/or medical procedures, law enforcement, and/or any other kind of process. Various configurations are possible and contemplated without departing from the scope of the present disclosure.

Additionally, although the above is illustrated and described in the context of analyzing the communication for identifying or checking the file and/or generating the recommendation, it is understood that this is an example and that other information may be additionally and/or alternatively analyzed to identify or check the file and/or generate the recommendation without departing from the scope of the present disclosure. In some implementations, various properties of the file, the sender, and so on may be additionally and/or alternatively used. For example, a sender may be identified as a loan officer associated with a file and recommendations appropriate for loan officers may be generated as opposed to recommendations appropriate for senders performing other roles, such as realtors. Various arrangements are possible and contemplated without departing from the scope of the present disclosure.

In various examples, this example method 300 may be implemented as a group of interrelated software modules or components that perform various functions discussed herein. These software modules or components may be executed by one or more computing devices, such as the file store query server 103 of FIG. 1.

Returning to FIG. 1, in various implementations where generated recommendations are modified before sending, the system 100 may monitor changes that are made to the recommendation before sending and the artificial intelligence engine may be updated based on those changes. In this way, the recommendations generated by the artificial intelligence engine may be made more accurate and efficient by taking into account what should have been generated in the recommendations as compared to what was actually generated, essentially "learning" over time.

Figure 4:
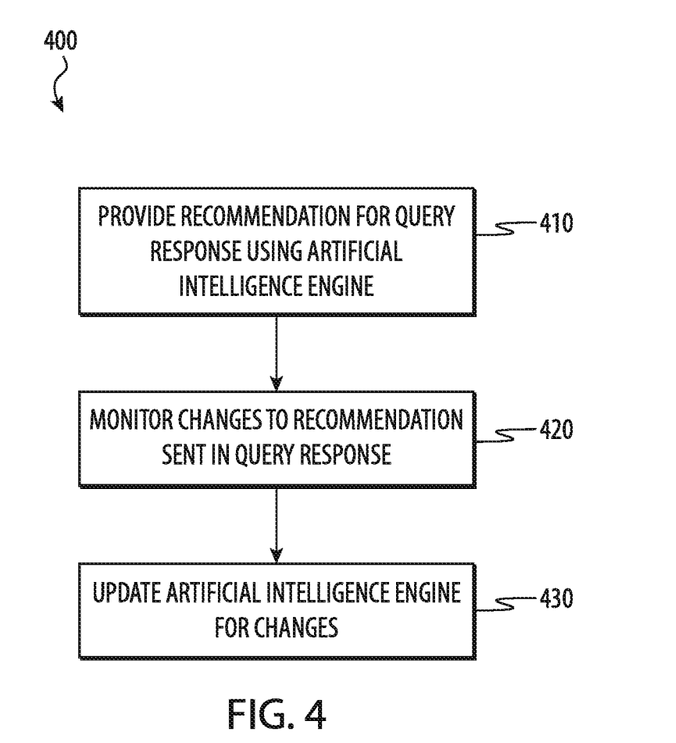
FIG. 4 depicts a flow chart illustrating an example method for updating an artificial intelligence engine used in intelligent machine processing of queries for cloud-based network file stores. This method may be performed by the file store query server of FIG. 1.

For example, FIG. 4 depicts a flow chart illustrating an example method 400 for updating an artificial intelligence engine (such as one or more rules engines, lists of regular expressions or other rules, inference engines, knowledge bases, computer models, and so on) used in intelligent machine processing of queries for cloud-based network file stores. The artificial intelligence engine may be one that is used in the method 300 discussed above and/or one or more of the methods 500-700 discussed below. This method 400 may be performed by an electronic device, such as the file store query server 103 of FIG. 1.

At operation 410, an electronic device may provide a recommendation for a query response using an artificial intelligence engine (such as one or more rules engines, lists of regular expressions or other rules, inference engines, knowledge bases, computer models, and so on). The query response may correspond to a query associated with a received communication, such as at operation 330 of method 300 of FIG. 3. The recommendation may be provided to personnel who may send the recommendation as a response to the query and/or modify the recommendation before sending.

At operation 420, the electronic device may monitor changes to the recommendation that are sent in the query response. Such changes may include removing one or more documents that were pulled from a file store when generating the recommendation, adding one or more documents pulled from a file store that were not included in generating the recommendation, and so on.

Because these portions of the recommendation are changed before sending, it may be assumed that the recommendation should have included them. As such, at 430, the electronic device may update the artificial intelligence engine for the changes. In this way, the artificial intelligence engine will more accurately generate recommendations in the future.

Although the example method 400 is illustrated and described as including particular operations performed in a particular order, it is understood that this is an example. In various implementations, various orders of the same, similar, and/or different operations may be performed without departing from the scope of the present disclosure.

For example, in some examples, the method 400 may omit providing the recommendation. Instead, in such examples the method 400 may be performed by an electronic device that monitors recommendations provided by another device in order to update an artificial intelligence engine for changes made to the recommendations. Various configurations are possible and contemplated without departing from the scope of the present disclosure.

In various examples, this example method 400 may be implemented as a group of interrelated software modules or components that perform various functions discussed herein. These software modules or components may be executed by one or more computing devices, such as the file store query server 103 of FIG. 1.

Returning to FIG. 1, in some implementations, a system for intelligent machine processing of queries for cloud-based network file stores may be a ticket-based system where a ticket is received for an initial communication associated with a query and subsequent communications associated with that query are part of a conversation corresponding to the ticket. Thus, there may be one "conversation" per "ticket." In some examples of such implementations, separate tickets may be generated when an initial communication includes multiple queries and/or when subsequent communications in the conversation include new queries. However, in alternative embodiments, tickets may be cross-linked and/or conversations may be part of multiple tickets.

Figure 5:
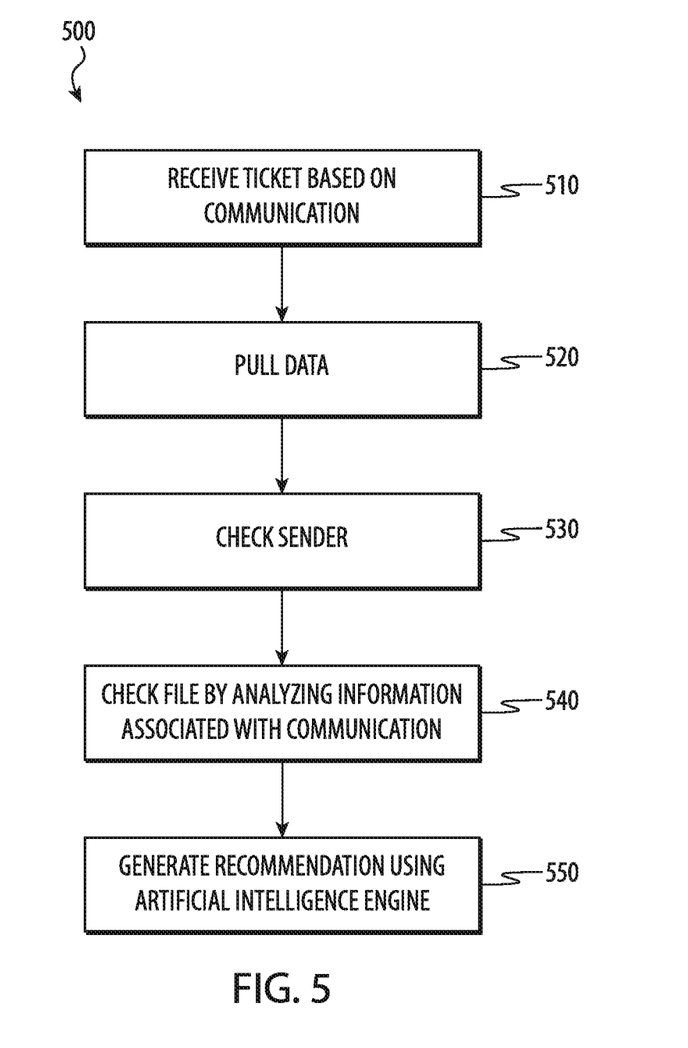
FIG. 5 depicts a flow chart illustrating a second example method for intelligent machine processing of queries for cloud-based network file stores. This method may be performed by the file store query server of FIG. 1.

By way of an example of a ticket-based system, FIG. 5 depicts a flow chart illustrating a second example method 500 for intelligent machine processing of queries for cloud-based network file stores. This method 500 may be performed by the file store query server 103 of FIG. 1.

At operation 510, an electronic device may receive a ticket based on a communication. The ticket may correspond to one or more queries to a file store associated with the communication. As such, the ticket may remain open until the query is responded to. At that time, the ticket may be "closed."

At operation 520, the electronic device may pull data for the ticket. For example, the ticket may not include all of the information from the communication. As such, data from the communication may be pulled when processing the ticket. In other examples, the ticket may include all of the information from the communication. In such an example, operation 520 may be omitted.

At operation 530, the electronic device may check the sender of the communication. For example, the electronic device may check to ensure that the sender is known, that the sender is authorized to perform the query, that the sender is registered and/or otherwise configured to utilize the file store, and so on.

At operation 540, the electronic device may check a file. Checking the file may include identifying the file or group of documents associated with the query by analyzing information associated with the communication. For example, a query may specify an order number and/or other identifier associated with a file. In such an example, the file associated with the order number and/or other identifier may be determined. By way of another example, a particular sender may be associated with one or more files. In such an example, the file associated with the sender may be determined and/or filtered to a number of possible files associated with the sender. By way of still another example, a query related to an escrow transaction, such as a private real estate transaction, may specify a property address and the file associated with the property address may be determined and/or filtered to a number of possible files associated with the property address.

At operation 550, the electronic device may generate a recommendation using an artificial intelligence engine (such as one or more rules engines, lists of regular expressions or other rules, inference engines, knowledge bases, computer models, and so on). The recommendation may be provided to personnel to send as a response to the query and/or modified before sending. Alternatively, the recommendation may be sent by the electronic device, such as where the artificial intelligence engine indicates a high percentage of certainty (such as 95%) that the recommendation is correctly responsive to the query. One or more documents may be retrieved and/or attached to a draft reply communication as part of generating the recommendation. Alternatively, in some implementations, the locations of where personnel can locate the documents may be provided as part of generating the recommendation and the personnel may then use the locations to retrieve and/or attach such documents to a reply.

Although the example method 500 is illustrated and described as including particular operations performed in a particular order, it is understood that this is an example. In various implementations, various orders of the same, similar, and/or different operations may be performed without departing from the scope of the present disclosure.

For example, the method 500 illustrates checking the sender and checking the file as separate operations. However, in various examples, checking the sender may be part of analyzing the communication to identify the file and/or generating the recommendation. Various configurations are possible and contemplated without departing from the scope of the present disclosure.

Additionally, although the above is illustrated and described in the context of analyzing the communication for identifying or checking the file and/or generating the recommendation, it is understood that this is an example and that other information may be additionally and/or alternatively analyzed to identify or check the file and/or generate the recommendation without departing from the scope of the present disclosure. In some implementations, various properties of the file, the sender, and so on may be additionally and/or alternatively used. For example, a sender may be identified as a loan officer associated with a file and recommendations appropriate for loan officers may be generated as opposed to recommendations appropriate for senders performing other roles, such as realtors. Various arrangements are possible and contemplated without departing from the scope of the present disclosure.

In various examples, this example method 500 may be implemented as a group of interrelated software modules or components that perform various functions discussed herein. These software modules or components may be executed by one or more computing devices, such as the file store query server 103 of FIG. 1.

Figure 6:
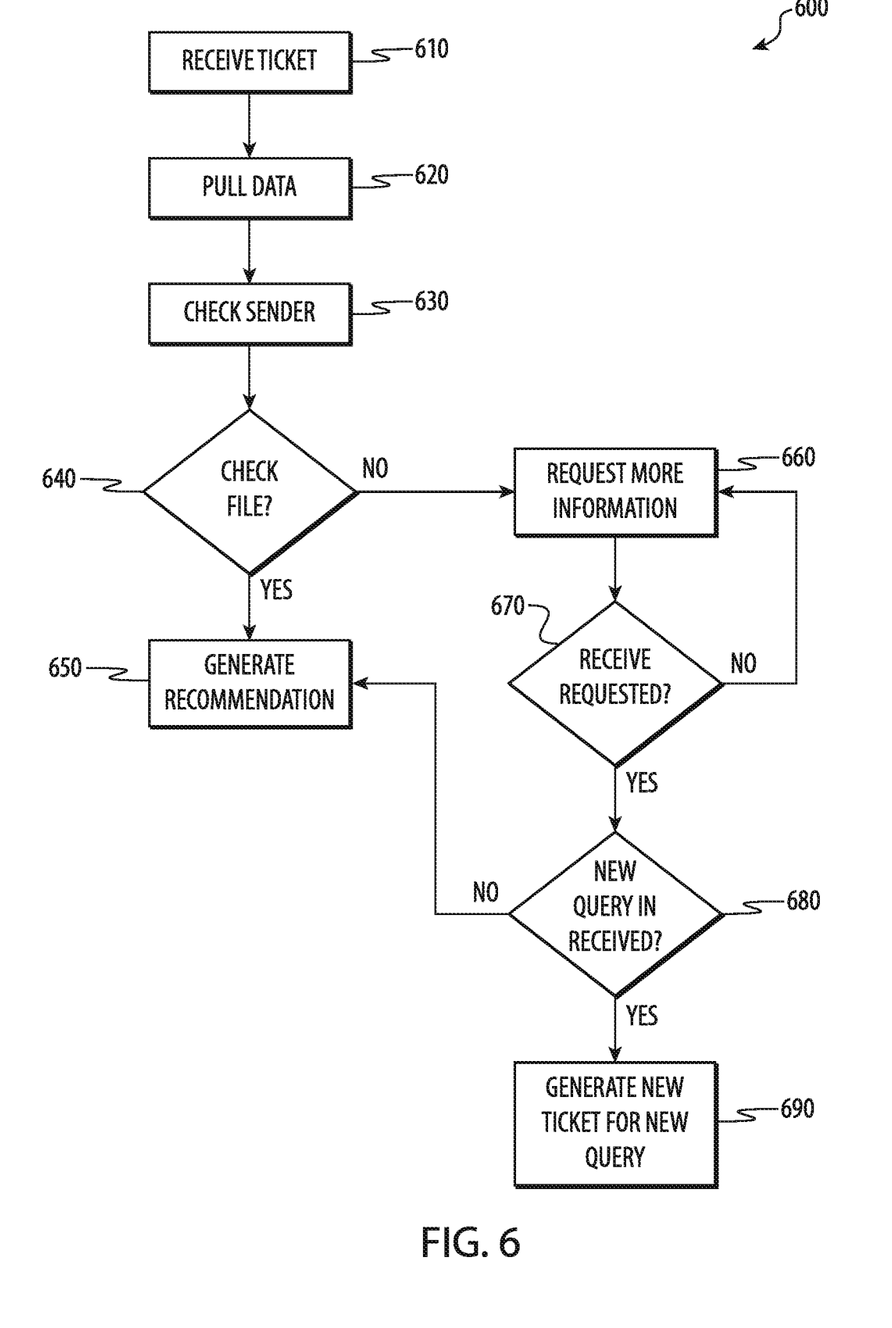
FIG. 6 depicts a flow chart illustrating a third example method for intelligent machine processing of queries for cloud-based network file stores. This method may be performed by the file store query server of FIG. 1.

By way of another example of a ticket-based system, FIG. 6 depicts a flow chart illustrating a third example method 600 for intelligent machine processing of queries for cloud-based network file stores. This method 600 may be performed by the file store query server 103 of FIG. 1.

At operation 610, an electronic device may receive a ticket generated in response to a communication associated with a query to a file store. At operation 620, the electronic device may pull data for the ticket, such as data from the communication. At operation 630, the electronic device may check the sender of the communication.

At operation 640, the electronic device may determine whether or not a file can be checked based on the data from the communication. By way of illustration, the electronic device may determine that a file can be checked when the communication specifies enough information to identify a file corresponding to the query. Similarly, the electronic device may determine that the data is insufficient for checking the file if the communication does not include sufficient information to identify a file and more information is needed to identify the file. For example, if the query requests seller's disclosure documents for an escrow transaction related to "Elm Street," there may be too many files for escrow transactions related to "Elm Street" as that street name is relatively common. As such, the electronic device may need additional information, such as the street number, the city, the zip code, and/or other information that would narrow the possible file numbers in order to identify the file.

If the electronic device determines the file can be checked, the flow may proceed to operation 650 where the electronic device generates a recommendation for a query response using an artificial intelligence engine (such as one or more rules engines, lists of regular expressions or other rules, inference engines, knowledge bases, computer models, and so on). One or more documents may be retrieved and/or attached to a draft reply communication as part of generating the recommendation. Alternatively, in some implementations, the locations of where personnel can locate the documents may be provided as part of generating the recommendation and the personnel may then use the locations to retrieve and/or attach such documents to a reply. Otherwise, the flow may proceed to operation 660.

At operation 660, the electronic device may request more information. The electronic device may request more information by responding to the communication, by providing personnel with a request for more information to send in response to the communication, and so on.

The flow may then proceed to operation 670 where the electronic device may determine whether or not the additional information is received. If not, the flow may return to operation 660 where the electronic device again requests the information. Otherwise, the flow may proceed to operation 680.

At operation 680, the electronic device may determine whether or not the additional information includes an additional query. The electronic device may restrict tickets to a single query and as such generate a new ticket to handle a new query. As such, if the additional information includes a new query, the flow may proceed to operation 690 where the electronic device may generate a new ticket for the new query. Otherwise, the flow may proceed to operation 650 where the electronic device may use the additional information to supplement the data from the communication in generating the recommendation.

Although the example method 600 is illustrated and described as including particular operations performed in a particular order, it is understood that this is an example. In various implementations, various orders of the same, similar, and/or different operations may be performed without departing from the scope of the present disclosure.

For example, the method 600 is illustrated and described as restricting a ticket to a single query. However, in other implementations, tickets may support multiple queries. In some examples of such implementations, separate recommendations may be generated for each query included in a ticket. In other examples of such implementations, the electronic device may generate a single recommendation that addresses all queries associated with the ticket, such as in a meta list that is organized by each query and the recommendation for a query response for that query. Various configurations are possible and contemplated without departing from the scope of the present disclosure.

In various implementations, different tickets may be grouped together and/or otherwise processed or analyzed in connection with each other. For example, in some implementations, the electronic device may associate all tickets that correspond to a particular file, all tickets that correspond to a particular sender, all tickets that correspond to a particular property, and so on. Various configurations are possible and contemplated without departing from the scope of the present disclosure.

By way of another example, the method 600 is illustrated and described as requesting additional information if the query does not indicate sufficient information for checking the file and/or for other purposes. However, it is understood that this is an example. In various implementations, the electronic device may analyze other sources when the query does not indicate sufficient information. The electronic device may analyze other portions of the communication outside of the query, other communications, a role of the sender, and so on.

For example, the method 600 may be used in the context of an escrow transaction system and the electronic device may determine that the sender is the secretary of a loan officer. The electronic device may infer that the secretary is communicating on behalf of the loan officer and may check one or more files associated with the loan officer. Various configurations are possible and contemplated without departing from the scope of the present disclosure.

Additionally, although the above is illustrated and described in the context of analyzing the communication for identifying or checking the file and/or generating the recommendation, it is understood that this is an example and that other information may be additionally and/or alternatively analyzed to identify or check the file and/or generate the recommendation without departing from the scope of the present disclosure. In some implementations, various properties of the file, the sender, and so on may be additionally and/or alternatively used. For example, a sender may be identified as a loan officer associated with a file and recommendations appropriate for loan officers may be generated as opposed to recommendations appropriate for senders performing other roles, such as realtors. Various arrangements are possible and contemplated without departing from the scope of the present disclosure.

In various examples, this example method 600 may be implemented as a group of interrelated software modules or components that perform various functions discussed herein. These software modules or components may be executed by one or more computing devices, such as the file store query server 103 of FIG. 1.

Figure 7:
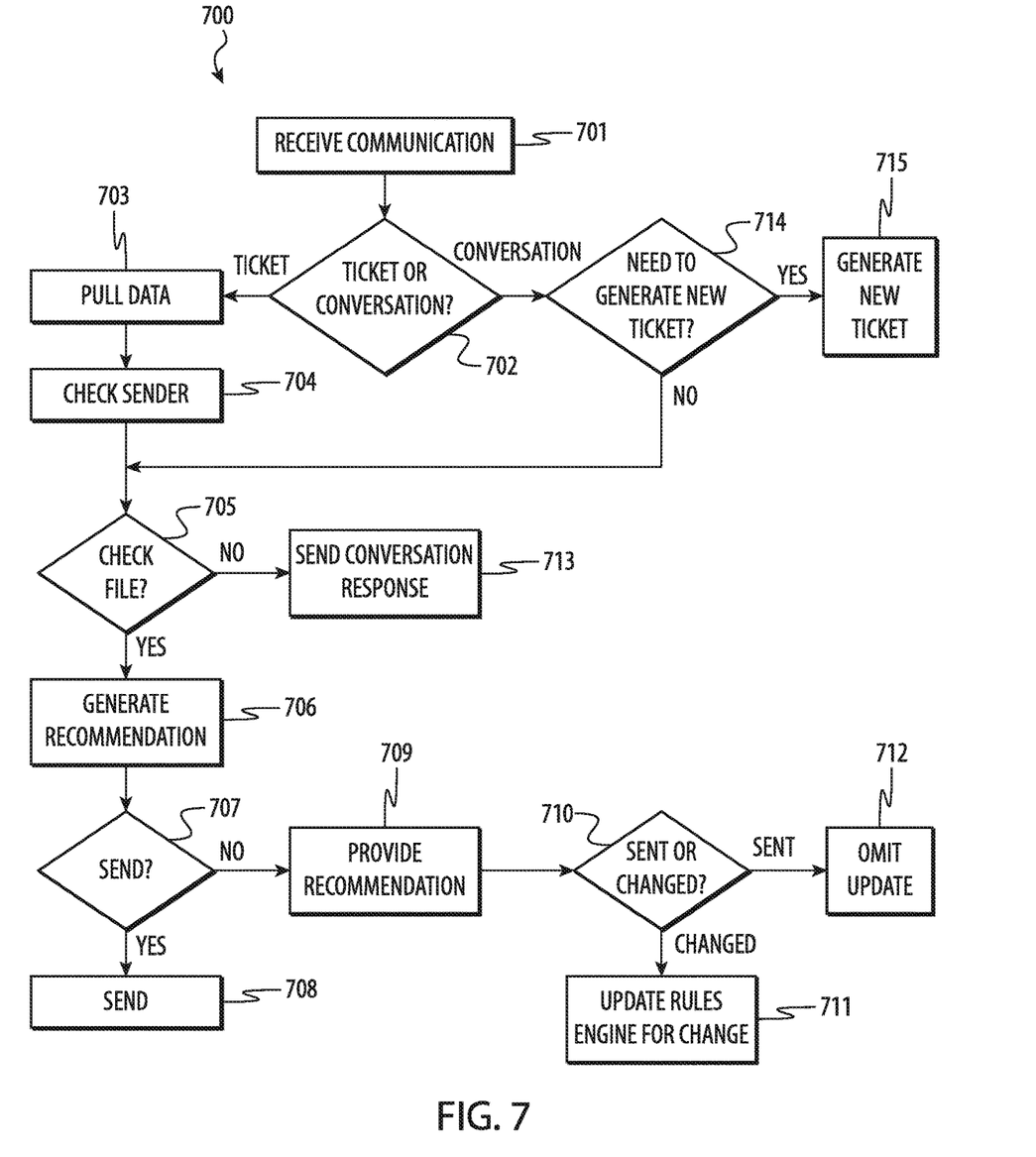
FIG. 7 depicts a flow chart illustrating a fourth example method for intelligent machine processing of queries for cloud-based network file stores. This method may be performed by the file store query server of FIG. 1.

By way of yet another example of a ticket-based system, FIG. 7 depicts a flow chart illustrating a fourth example method 700 for intelligent machine processing of queries for cloud-based network file stores. This method 700 may be performed by the file store query server 103 of FIG. 1.

At operation 701, an electronic device may receive a communication associated with a query. The flow may then proceed to operation 702 where the electronic device may determine whether to generate a ticket to process the query or whether the communication is part of a conversation regarding an existing ticket currently being processed (such as providing additional information needed to process a previous query, a communication that a previous query response was incorrect, and so on). If the electronic device generates a ticket, the flow may proceed to operation 703. Otherwise, the flow may proceed to operation 714.

At operation 703, after the electronic device generates the ticket, the electronic device may pull data associated with the communication or ticket. The flow may then proceed to operation 704 where the electronic device may check the sender of the communication. Next, the flow may proceed to operation 705 where the electronic device may determine whether or not a file can be checked using the pulled data. If not, the flow may proceed to operation 713 where the electronic device may send a conversation response to request more information. Otherwise, the flow may proceed to operation 706.

At operation 706, after the electronic device checks the file, the electronic device may generate a recommendation using an artificial intelligence engine (such as one or more rules engines, lists of regular expressions or other rules, inference engines, knowledge bases, computer models, and so on). The flow may then proceed to operation 707.

At operation 707, the electronic device may determine whether or not to send the recommendation as a query in response to the communication. For example, the electronic device may use the artificial intelligence engine to determine that there is a high probability (such as above 90%) that the recommendation correctly responds to the query and may determine to send the recommendation. Alternatively, the electronic device may use the artificial intelligence engine to determine that there is not a high probability (such as less than or equal to 90%) that the recommendation correctly responds to the query and may determine to provide the recommendation to personnel for review before sending. In still other alternatives, the electronic device may send a certain number of recommendations and provide others to personnel for review before sending, such as sending 9 out of 10 and providing the tenth to personnel for review before sending. If the electronic device determines to send the recommendation, the flow proceeds to operation 708 where the electronic device may send the recommendation. Otherwise, the flow may proceed to operation 709.

At operation 709, after the electronic device determines not to send the recommendation, the electronic device may provide the recommendation to personnel for review. In some implementations, the electronic device may add the recommendation to a review queue and personnel may access the review queue to evaluate, modify, and/or send recommendations as query responses.

The flow may then proceed to operation 710 where the electronic device may determine whether the provided recommendation was sent as provided or was changed before sending. If the provided recommendation was changed, the flow may proceed to operation 711 where the electronic device may update the artificial intelligence engine based on the changes. Otherwise, the flow may proceed to operation 712 where the electronic device omits updating the artificial intelligence engine.

At operation 714, after the electronic device determines the communication is part of a conversation, the electronic device may determine whether or not the communication triggers generation of a new ticket. For example, in some implementations, a communication that is part of a conversation but includes a new query may trigger generation of a new ticket to process the new query. If not, the flow may proceed to operation 705 where the electronic device determines whether or not a file can be checked. Otherwise, the flow may proceed to operation 715 where the electronic device may generate a new ticket because of the communication.

Although the example method 700 is illustrated and described as including particular operations performed in a particular order, it is understood that this is an example. In various implementations, various orders of the same, similar, and/or different operations may be performed without departing from the scope of the present disclosure.

For example, the method 700 is illustrated as determining whether or not to send a recommendation or provide the recommendation to personnel for review. However, in various implementations, the recommendations may be sent without determining whether or not to send. Various configurations are possible and contemplated without departing from the scope of the present disclosure.

Additionally, although the above is illustrated and described in the context of analyzing the communication for identifying or checking the file and/or generating the recommendation, it is understood that this is an example and that other information may be additionally and/or alternatively analyzed to identify or check the file and/or generate the recommendation without departing from the scope of the present disclosure. In some implementations, various properties of the file, the sender, and so on may be additionally and/or alternatively used. For example, a sender may be identified as a loan officer associated with a file and recommendations appropriate for loan officers may be generated as opposed to recommendations appropriate for senders performing other roles, such as realtors. Various arrangements are possible and contemplated without departing from the scope of the present disclosure.

In various examples, this example method 700 may be implemented as a group of interrelated software modules or components that perform various functions discussed herein. These software modules or components may be executed by one or more computing devices, such as the file store query server 103 of FIG. 1.

The above example implementations are illustrated and described with respect to text-based communications such as email, text message, and so on. However, in other examples, communications that involve formats other than text may be used without departing from the scope of the present disclosure. For example, in some examples, a telephone call may be monitored. Data from the monitoring may be used to generate one or more tickets and/or queries that may be processed according to one or more of the above discussed techniques. Various configurations are possible and contemplated without departing from the scope of the present disclosure.

Additionally, the above example implementations are illustrated and described with respect to queries associated with incoming communications. However, in various implementations, personnel may transmit outgoing messages that reference one or more documents in a file. As such, in some implementations, outgoing communications may be monitored to generate one or more queries using the references and use an artificial intelligence engine (such as one or more rules engines, lists of regular expressions or other rules, inference engines, knowledge bases, computer models, and so on) to generate a recommendation for one or more documents to attach to the outgoing communication and/or other information with which to supplement the outgoing communication. Various configurations are possible and contemplated without departing from the scope of the present disclosure.

Further, the above is illustrated and described in the context of querying file stores for one or more of a group of documents related to a file. However, it is understood that this is an example and that other implementations are possible without departing from the scope of the present disclosure. For example, various implementations may also include a database that stores metadata regarding the files and the above technologies may be used to query the database for the metadata. By way of illustration, the metadata may include the status of a file (such as whether or not a loan has been approved in the context of a private real estate transaction) and a query may request that status. Various configurations are possible and contemplated without departing from the scope of the present disclosure.

In various implementations, a system for intelligently processing queries for cloud-based network file stores may include a file store that stores groups of documents that are associated with files, a non-transitory storage medium that stores instructions, and a processor. The processor may execute the instructions to receive a ticket based on a communication associated with a query to the file store, pull data for the ticket, check a sender of the communication, identify a file using the data, and analyze the communication using an artificial intelligence engine to generate a recommendation.

In some examples, the artificial intelligence engine may include at least one regular expression. In various examples, the artificial intelligence engine may include a computer model.

In various examples, the communication may be an email. In various examples, the communication may be a text message. In still other examples, the communication may be a telephone call. In some examples, the communication may be an incoming communication. In other examples, the communication may be an outgoing communication.

In some examples, the query may be multiple queries. In various implementations of such examples, the recommendation may address the multiple queries. In other implementations of such examples, the processor may generate multiple recommendations that each address one of the multiple queries.

In various examples, the processor may receive an additional communication that is part of a conversation regarding the ticket. In some such examples, the processor may generate an additional ticket if the additional communication includes an additional query.

In some examples, the processor may modify the artificial intelligence engine based on changes personnel make to the recommendation before sending a query response.

In some implementations, a system for intelligently processing queries for cloud-based network file stores may include a non-transitory storage medium that stores instructions and a processor. The processor may execute the instructions to receive a communication associated with a query to a file store that stores groups of documents that are associated with files, check a sender of the communication, and analyze the communication using a computer model generated based on monitored changes to previous recommendations to identify a file and generate a recommendation.

In various examples, the communication may be received from a client application executing on a client device. In some examples, the files may be associated with escrow transactions.

In various implementations, a system for intelligently processing queries for cloud-based network file stores may include a non-transitory storage medium that stores instructions and a processor. The processor may execute the instructions to receive a communication associated with a query to a file store that stores groups of documents that are associated with files, check a sender of the communication, identify a file based on the communication, and analyze the communication using an artificial intelligence engine to generate a recommendation.

In some examples, the processor may determine additional data is needed to identify the file and transmits a request for the additional data. In various examples, the recommendation may include at least one document obtained from the file store.

Although the above discusses a number of different embodiments, it is understood that these are examples. In various implementations, various portions of these different embodiments may be combined without departing from the scope of the present disclosure.

As described above and illustrated in the accompanying figures, the present disclosure relates to intelligent machine processing of queries for cloud-based network file stores. One or more cloud-based network file store servers may receive one or more communications (such as one or more emails, text messages, audio, and/or other communications from one or more client devices and/or client applications) associated with one or more queries for a file store that stores groups of documents that are each associated with different files. A file may be identified based on information in the one or more communications and a recommendation for responding to the query may be generated using one or more artificial intelligence engines (such as one or more rules engines, lists of regular expressions or other rules, inference engines, knowledge bases, computer models, and so on).

In this way, one or more cloud-based network file store servers may be capable of automatically and/or semi-automatically interpreting and processing queries for a file store that they would not otherwise be capable of performing. This may involve less configuration of client devices and/or client applications, less knowledge in operating client devices and/or client applications, more efficient client device operation, less network usage for communication between client devices and/or client applications and cloud-based network file stores, less personnel at the level of accessing the network file store, more efficient use of cloud-based network file store resources, and so on.

In some embodiments, personnel who access the network file store may review and/or modify the generated recommendations before query responses are sent. Generated recommendations (such as draft emails, text messages, and/or other communications responses) may include one or more documents, references to such documents, and/or information about such documents and/or the query that the personnel may select, remove, and/or otherwise modify.

In various embodiments, the recommendations may be sent automatically. In some implementations, some generated recommendations may be automatically sent while others are reviewed (such as those generated with a high confidence score of correctly responding to the query associated with the communication, those not flagged for screening by network file store level personnel to ensure automatically sent responses are correctly responding to the query associated with the communication, and so on).

In various implementations where generated recommendations are modified before sending, the system may monitor changes that are made to the recommendation before sending and the artificial intelligence engine may be updated based on those changes. In this way, the recommendations generated by the artificial intelligence engine may be made more accurate and efficient by taking into account what should have been generated in the recommendations as compared to what was actually generated, essentially "learning" over time.

In some implementations, a system for intelligent machine processing of queries for cloud-based network file stores may be a ticket-based system where a ticket is received for an initial communication associated with a query and subsequent communications associated with that query are part of a conversation corresponding to the ticket. In some examples of such implementations, separate tickets may be generated when an initial communication includes multiple queries and/or when subsequent communications in the conversation include new queries.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A system for intelligently processing queries for cloud-based network file stores, comprising:
a cloud-based network file store server that stores groups of escrow transaction documents that are associated with escrow transaction files, each escrow transaction file including a set of the escrow transaction documents associated with an escrow transaction;
a non-transitory storage medium that stores instructions; and
a processor that executes the instructions to:
receive a ticket based on a communication associated with a query to the file store from a client application executing on a client device; and
launch asynchronous processes to process the query by:
pulling data for the ticket;
checking a sender of the communication to determine a role of the sender of the communication;
identifying a file using the data and information included in the communication including the sender of the communication, an order number of other escrow transaction specified in the communication, or a name of a escrow transaction document specified in the communication;
analyzing the communication using an artificial intelligence engine to generate a recommendation by evaluating rules according to the information included in the communication, the file, the sender of the communication, or the role of the role of the sender of the communication;
generate a query response using the recommendation, the query response including at least one of the group of escrow transaction documents;
determine a confidence score for the query response;
send the query response if the confidence score is at least equal to a threshold; and
flag the query response for screening if the confidence score is below the threshold.

2. The system of claim 1, wherein the artificial intelligence engine comprises at least one regular expression.

3. The system of claim 1, wherein the artificial intelligence engine comprises a computer model.

4. The system of claim 1, wherein the communication comprises an email.

5. The system of claim 1, wherein the communication comprises a text message.

6. The system of claim 1, wherein the communication comprises a telephone call.

7. The system of claim 1, wherein the communication is an incoming communication.

8. The system of claim 1, wherein the communication is an outgoing communication.

9. The system of claim 1, wherein the query comprises multiple queries.

10. The system of claim 9, wherein the recommendation addresses the multiple queries.

11. The system of claim 9, wherein the processor generates multiple recommendations that each address one of the multiple queries.

12. The system of claim 1, wherein the processor receives an additional communication that is part of a conversation regarding the ticket.

13. The system of claim 12, wherein the processor generates an additional ticket if the additional communication includes an additional query.

14. The system of claim 1, wherein the processor modifies the artificial intelligence engine based on changes personnel make to the recommendation before sending the query response.

15. A method, comprising:
receiving, from a client application executing on a client device, a ticket based on a communication associated with a query to a cloud-based network file store server that stores groups of escrow transaction documents that are associated with escrow transaction files, each escrow transaction file including a set of the escrow transaction documents associated with an escrow transaction; and
launching asynchronous processes to process the query by:
pulling data for the ticket;
checking a sender of the communication to determine a role of the sender of the communication;
identifying a file using the data and information included in the communication including the sender of the communication, an order number of other escrow transaction specified in the communication, or a name of a escrow transaction document specified in the communication; and
analyzing the communication using an artificial intelligence engine to generate a recommendation by evaluating rules according to the information included in the communication, the file, the sender of the communication, or the role of the role of the sender of the communication, the recommendation;
generating a query response using the recommendation, the query response including at least one of the group of escrow transaction documents;
determining a confidence score for the query response;
sending the query response if the confidence score is at least equal to a threshold; and
flagging the query response for screening if the confidence score is below the threshold.

16. The method of claim 15, wherein the communication is received from a client application executing on a client device.

17. The method of claim 15, further comprising attaching the at least one the group of escrow transaction documents to the query reply.

18. The method of claim 15, further comprising:
determining additional data is needed to identify the file; and
transmitting a request for the additional data.

19. The method of claim 15, wherein the recommendation includes at least one document obtained from the file store.

20. The method of claim 15, wherein the artificial intelligence engine uses a computer model generated based on monitored changes to previous recommendations.

* * * * *